United States Patent [19]
Fujimoto et al.

[11] Patent Number: 5,565,167
[45] Date of Patent: Oct. 15, 1996

[54] STAINLESS STEEL EXCELLENT IN FUSED-SALT CORROSION RESISTANCE AND METHOD OF PRODUCING THE SAME

[75] Inventors: Nobukazu Fujimoto, Shinnanyo; Naoto Hiramatsu, Tokuyama; Yoshihiro Uematsu, Kudamatsu, all of Japan

[73] Assignee: Nisshin Steel Co., Ltd., Tokyo, Japan

[21] Appl. No.: 481,466

[22] PCT Filed: Nov. 8, 1994

[86] PCT No.: PCT/JP94/01883

§ 371 Date: Jul. 10, 1995

§ 102(e) Date: Jul. 10, 1995

[87] PCT Pub. No.: WO95/13404

PCT Pub. Date: May 18, 1995

[30] Foreign Application Priority Data

Nov. 9, 1993 [JP] Japan .................... 5-304700

[51] Int. Cl.$^6$ .................... C22C 38/06; C22C 38/40; C21D 8/02
[52] U.S. Cl. .................... 420/50; 420/62; 148/327; 148/325; 148/609
[58] Field of Search .................... 420/50, 62; 148/325, 148/609, 327

[56] References Cited

U.S. PATENT DOCUMENTS

| 4,102,225 | 7/1978 | Michels | 420/50 |
| 4,802,894 | 2/1989 | Usami et al. | 420/50 |

FOREIGN PATENT DOCUMENTS

| 55-43498 | 11/1980 | Japan . |
| 59-229468 | 12/1984 | Japan . |
| 60-262945 | 12/1985 | Japan . |
| 62-294153 | 12/1987 | Japan . |
| 1-252757 | 10/1989 | Japan . |

*Primary Examiner*—Deborah Yee
*Attorney, Agent, or Firm*—Lowe, Price, LeBlanc & Becker

[57] ABSTRACT

A stainless steel excellent in fused-salt corrosion resistance having a composition specified in weight per cent including not more than 0.1% of C, not more than 2.0% of Mn, not less than 7.5% and less than 15.0% of Ni, 14.0–20.0% of Cr, more than 0.2% and not more than 4.0% of Si, and 1.0–4.0% of Al, and in some cases also including one or more of not more than 3.0% of Cu, not more than 3.0% of Mo, not more than 1.0% of Ti, not more than 1.0% of Zr, not more than 0.5% Y, and not more than 0.5% of REM, and satisfying the relationship Si%/Al%≦1.0, the balance being Fe and unavoidable impurities.

4 Claims, 7 Drawing Sheets

STAINLESS STEEL EXCELLENT IN FUSED-SALT CORROSION RESISTANCE AND METHOD OF PRODUCING THE SAME

TECHNICAL FIELD

This invention relates to a stainless steel excellent in fused-salt corrosion resistance and more particularly to a stainless steel for the separator of a fused carbonate fuel cell.

BACKGROUND ART

The material used for the separator of a fused carbonate fuel cell is required to exhibit a degree of corrosion resistance sufficient to be safe from fused-salt corrosion by the fused carbonate electrolyte of the cell. The practice has therefore been to use a high-grade stainless steel such as SUS316L or SUS310S as the material for the separator of a fused carbonate fuel cell.

Since the fused-salt corrosion resistance of a stainless steel is known to be generally proportional to its Cr content, high Cr content stainless steels such as SUS310S are the most frequently used. Stainless steels with high Cr content also include a large amount of Ni for stabilizing the austenite phase.

Such steels have also been used as separator material after being imparted with high corrosion resistance by coating with alumina.

Technologies for improving the resistance of stainless steels to corrosion by fused carbonate are taught by, for example, JPA-62-294153 (Separator Material for Fuel Cells) and JPA-1-252757 (Fe-base Alloy Excellent in Fused-Carbonate Corrosion Resistance). The first of these, JPA-62-294153, teaches improvement of fused-carbonate corrosion resistance by addition of Al to the steel.

When a large amount of Al is added to a stainless steel for increasing resistance to fused salt, however, the hot workability of the steel is markedly degraded and large cracks tend to occur during hot rolling for production of steel sheet. Since this restricts the size of the steel sheet that can be produced, lower product yield and higher production cost are unavoidable. For coping with this hot workability problem of austenitic stainless steel containing Al, JPB-55-43498 teaches a method of improving the hot workability of a stainless steel such as by causing precipitation of a small amount of δ ferrite during solidification or by addition of a rare earth element such as La or Ce, while JPA-60-262945 proposes a method of preventing cracking by conducting hot rolling at a temperature in the range of 1000°–1200° C.

OBJECT OF THE INVENTION

Since the corrosive activity of the fused carbonate of a fuel cell is extremely strong, even use of a high-grade stainless steel such as SUS316L or SUS310S as the separator material does not provide adequate corrosion resistance. The problems of high raw material cost and poor hot workability are particularly severe in the case of SUS310S owing to its high Cr and Ni content. From the viewpoint of product cost, it is important to reduce Cr and Ni content, especially Ni content, as far as possible. In this regard, JPA-62-294153 (Separator Material for Fuel Cells), with its basic 25% Cr—20% Ni composition, is high in raw material cost and also not very good in workability.

The method of improving the corrosion resistance of the separator material by coating the surface of the stainless steel with alumina has the drawback of making the overall production process complex because it requires additional steps such as for coating and heat treatment.

The Fe-base alloy with excellent fused-carbonate corrosion resistance described in JPA-1-252757 has to have a particularly low Si content. Since this makes it necessary to take special precautions during steel production, the production cost becomes high.

While JPB-55-43498 and JPA-60-262945 disclose Al-containing steels with excellent heat resistance and oxidation resistance, they include no teaching regarding improvement of corrosion resistance in a fused-salt environment involving high temperature, extremely strong corrosivity and a complex corrosive mechanism.

The object of this invention is therefore to develop an inexpensive stainless steel separator material for fuel cells which exhibits excellent resistance to fused-carbonate corrosion as well as excellent workability and hot workability, notwithstanding that its Cr and Ni contents are held to the very minimum.

DISCLOSURE OF THE INVENTION

The present invention provides a stainless steel excellent in fused-salt corrosion resistance having a composition specified in weight per cent including not more than 0.1% of C, not more than 2.0% of Mn, not less than 7.5% and less than 15.0% of Ni 14.0–20.0% of Cr, more than 0.2% and not more than 4.0% of Si, and 1.0–4.0% of Al, and in some cases also including one or more of not more than 3.0% of Cu not more than 3.0% of Mo, not more than 1.0% of Ti, not more than 1.0% of Zr, not more than 0.5% Y, and not more than 0.5%, preferably not more than 0.05%, of REM (rare earth elements), and satisfying the relationship $Si\%/Al\% \leq 1.0$, preferably the relationship, $Si\%/Al\% \leq 0.4$, the balance being Fe and unavoidable impurities.

The composition of the stainless steel of the invention is further preferably adjusted to satisfy the relationship $(Si\%+Al\%)/Ni\% \leq 0.47$ The composition of the stainless steel of the invention is further preferably adjusted so that the value of δ(%) represented by the equation set out below falls in the range of 0.5–4.0, since a steel with this δ(%) can be advantageously produced as a hot-rolled steel sheet by adopting as a hot rolling condition that the hot rolling is completed at a temperature of not less than 1000° C. (that the temperature of the steel on the delivery side of the finishing mill is not less than 1000° C.)

$\delta(\%) = 1.57 \cdot Cr + 0.7 \cdot Si + 3.89 \cdot Al - 1.57 \cdot Ni - 0.16 \cdot Mn - 38.5 \cdot C - 7.65$.

In this case, the REM content, if any, is kept to not more than 0.05%.

DISCLOSURE OF THE INVENTION

Through extensive research into the corrosion behavior of stainless steel in the environment of a fused carbonate fuel cell, the inventors discovered that a stainless steel having excellent corrosion resistance against fused carbonate can be obtained by combined addition of Si and Al within specific content ranges, without greatly increasing the Cr and Ni contents. More specifically, a stainless steel exhibiting excellent corrosion resistance against fused carbonate can be obtained by combined addition of more than 0.2% of Si and not less than 1.0% of Al so as to satisfy the relationship $$Si\%/Al\% \leq 1.0$$

preferably the relationship, $$Si\%/Al\% \leq 0.4.$$

Figure 1:
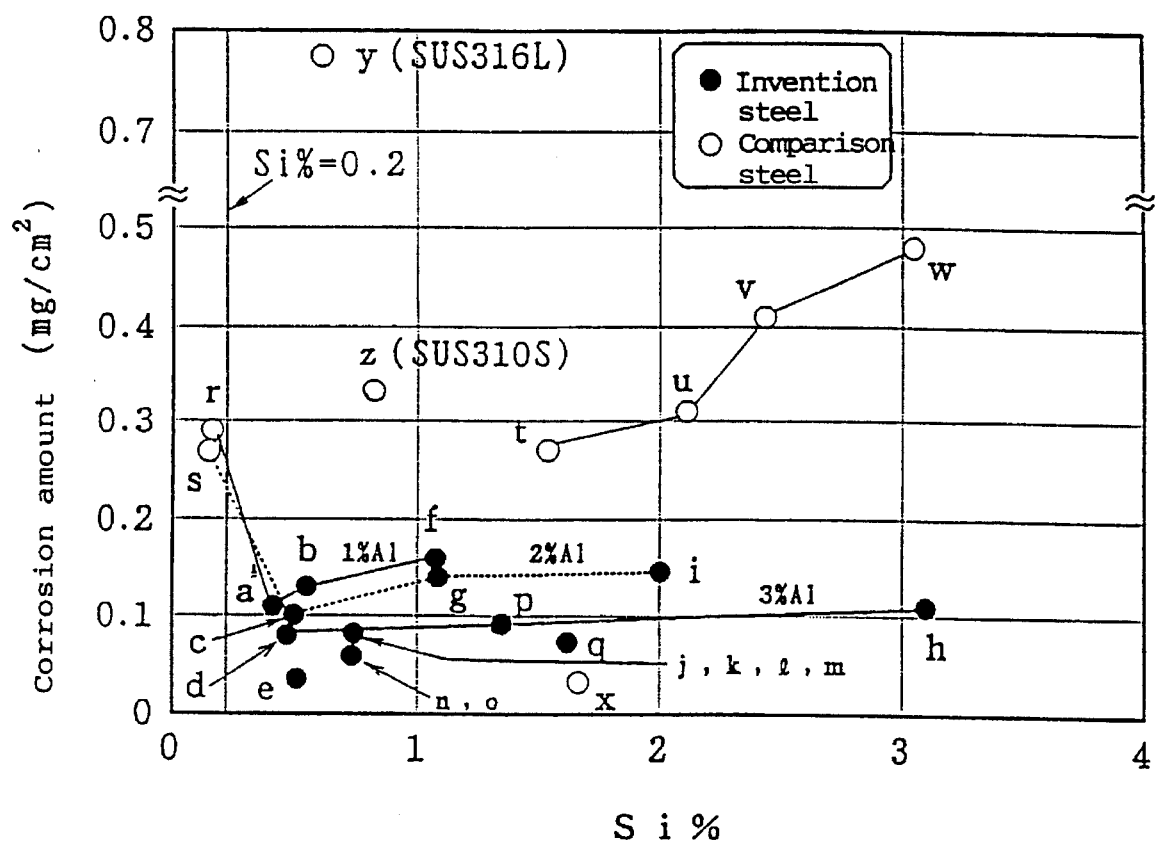
FIG. 1 is a graph showing how the amount of corrosion of steels in fused carbonate varies with Si content.
Figure 2:
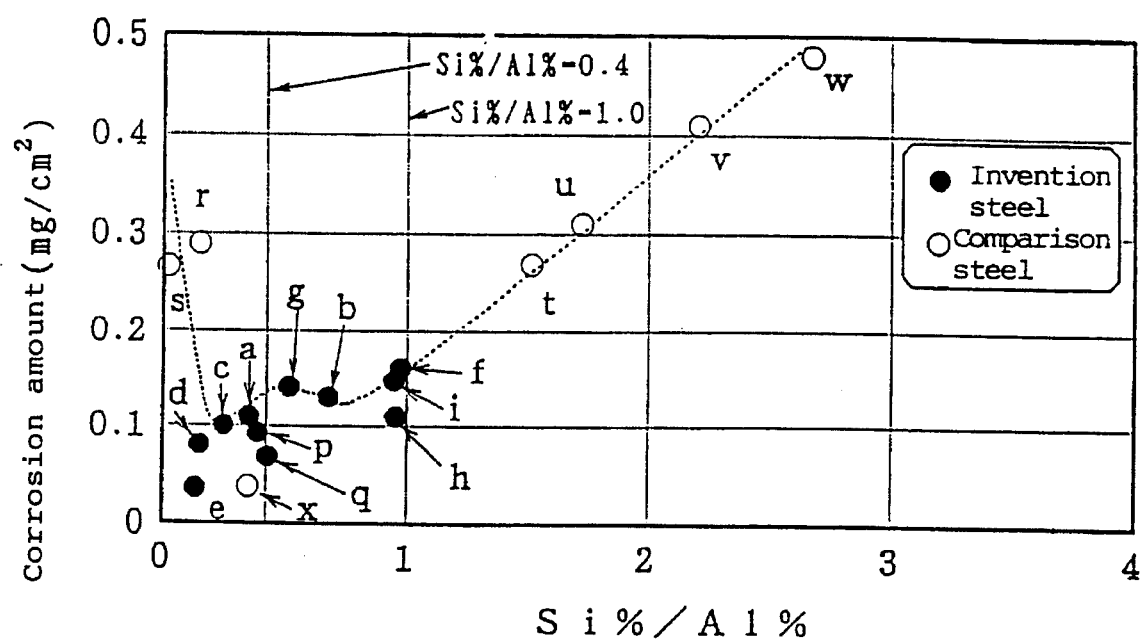
FIG. 2 is a graph showing how the amount of corrosion of steels in fused carbonate varies with the ratio Si%/Al%.
Figure 4:
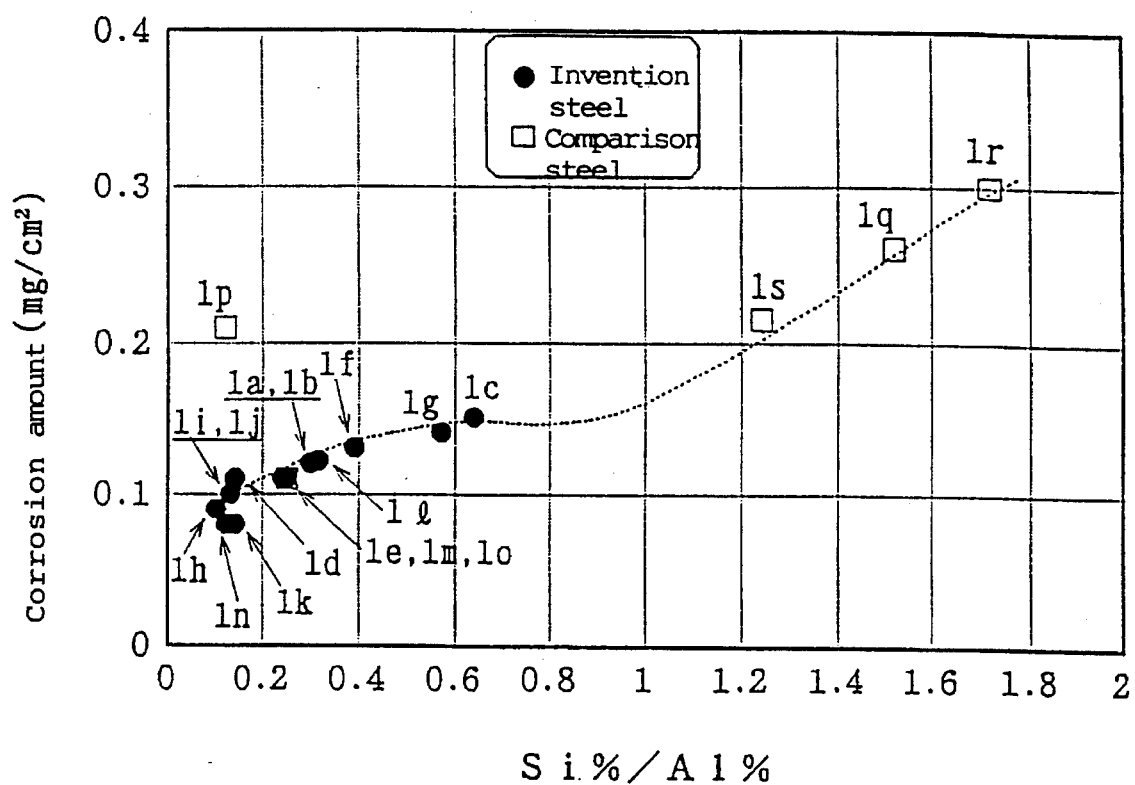
FIG. 4 is a graph showing how the amount of corrosion of steels in fused carbonate varies with the ratio Si%/Al%.

This can be considered to be attributable to the formation of an Al oxide layer and a Si oxide layer on the stainless steel surface. A detailed explanation of the foregoing will be given later in connection with the Examples (FIGS. 1, 2 and 4).

Although this combined addition of Si and Al degrades the steel workability, it was found that, as will be shown later in the Examples (FIG. 3), this problem can be overcome by controlling the Ni content to satisfy $$(Si\%+Al\%)/Ni\% \leq 0.47.$$

In addition, a steel containing Al such as that of according to the invention is generally poor in hot workability and is apt to rupture if used for production of hot-rolled sheet using an ordinary hot rolling mill. As shown later in the Examples (FIGS. 5 and 7), it was found that this problem can be overcome by adjusting the amounts of the components to bring the aforesaid δ(%) value within the range of 0.5–4.0 and completing the hot rolling at not lower than 1000° C. in this case, the REM content, if any, is kept to not more than 0.05% (FIG. 6).

The effect of the individual components of the invention steel and reasons for the content limits thereof will now be explained.

C: The C content is set at not more than 0.1% because the hot workability of the steel is degraded when the C content is too high. A C content exceeding 0.03% is preferable for improving the high-temperature strength of the steel.

Mn: Since Mn is an austenite-forming element and serves as a deoxidizer and a desulfurizer during steelmaking, ordinary austenitic stainless steels contain about 1% of Mn. Since excessive addition degrades resistance to fused-salt corrosion, however, the Mn content is set to not more than 2.0% in this invention.

Ni: Ni is an austenite-forming element that has to be included in an amount of not less than 7.5% for maintaining the austenite phase. Since excessive inclusion increases product cost, however, its upper limit is set to less than 15.0%.

Cr: Cr plays an important role in improving the steel's resistance to corrosion by fused carbonate. For this, a Cr content of not less than 14.0% is required. Since a large Cr content destabilizes the austenite phase and degrades hot workability, however, the upper limit thereof is set to not more than 20.0%.

Si: Si acts to improve the high-temperature strength and corrosion resistance of the steel. When the invention steel is used as a material for the separator of a fuel cell, the high affinity of Si for oxygen causes the formation of silicon oxide in the vicinity of the grain boundaries near the interface between the stainless steel base metal and the oxide layer formed on the steel surface owing to fused-salt corrosion. This silicon oxide layer acts to suppress corrosion of the stainless steel by preventing diffusion of atoms through the grain boundaries. As explained below, this effect is promoted by the Al contained in the steel. An Si content exceeding 0.2% is required for improving corrosion resistance against fused carbonate. Since large addition of Si impairs productivity and hot workability, however, its content is limited to not more than 4.0%.

Al: Al has a deoxidizing effect and acts to improve corrosion resistance against fused carbonate. Although addition of not less than 1.0% of Al is required for obtaining sufficient corrosion resistance against fused carbonate, too large an Al content degrades productivity and hot workability. The Al content is therefore set at 1.0–4.0%.

One feature of the invention is that it achieves an improvement in fused-carbonate corrosion resistance by combined addition of Si and Al. This is demonstrated later in the Examples (FIGS. 1, 2 and 4). The effect of the combined addition can be analyzed as follows.

As explained earlier, the silicon oxide layer which forms at the interface between the oxide layer on the outermost surface and the stainless steel base metal when the Si content is right acts as a kind of barrier preventing the diffusion of atoms in and out of the stainless steel and, as such, increases the corrosion resistance of the stainless steel. Tests conducted by the inventors show, however, that this silicon oxide has low stability (high solubility) with respect to fused carbonate. Thus if fused carbonate should penetrate the oxide layer on the outermost surface of the steel and invade the silicon oxide layer, the silicon oxide will dissolve and not be able to provide adequate anticorrosion effect.

When the steel contains an appropriate amount of Al, however, an aluminum oxide layer is formed on the outside of the silicon oxide layer and protects the silicon oxide layer from the fused carbonate, and the co-presence of Si oxide layer and the Al oxide layer, both of which have small atomic diffusion coefficients, even more thoroughly suppresses corrosion of the stainless steel itself.

This effect can be obtained within the aforesaid ranges of Si and Al content when the relationship $$Si\%/Al\% \leq 1.0$$

is satisfied, and when the preferred relationship $$Si\%/Al\% \leq 0.4$$

is satisfied, extremely good corrosion resistance against fused carbonate is achieved.

Moreover, the resistance to corrosion by fused carbonate can be further enhanced by addition to the aforesaid basic composition of an appropriate amount of one or more of Cu, Mo, Ti, Zr, Y and REM. The preferable contents of the elements are as follows:

Cu: Cu improves corrosion resistance against fused carbonate. Since excessive addition degrades weldability and hot workability, however, the Cu content is set at not more than 3.0%.

Mo: Mo improves corrosion resistance against fused carbonate. Since excessive addition degrades weldability and hot workability, however, the Mo content is set at not more than 3.0%.

Ti: Ti improves the high-temperature strength of the steel and also enhances its fused-carbonate corrosion resistance. Since addition of a large amount of Ti degrades toughness, however, the Ti content is defined as not more than 1.0%.

Zr: Zr improves the high-temperature strength of the steel and also enhances its fused-carbonate corrosion resistance. Since addition of a large amount of Zr degrades weldability and lowers the cleanliness of the steel, however, the Zr content is set at not more than 1.0%.

Y: Y improves corrosion resistance against fused carbonate. Since addition of a large amount of Y degrades hot workability, however, the content is set at not more than 0.5 wt %.

REM: REMs (rare earth elements) improve corrosion resistance against fused carbonate and the addition of small amounts thereof also enhances hot workability. Since addition of a large amount thereof degrades hot workability, however, the REM content is set at not more than 0.5 wt %. For improving hot workability it is preferable for the REM content to be not more than 0.05 wt %.

Figure 3:
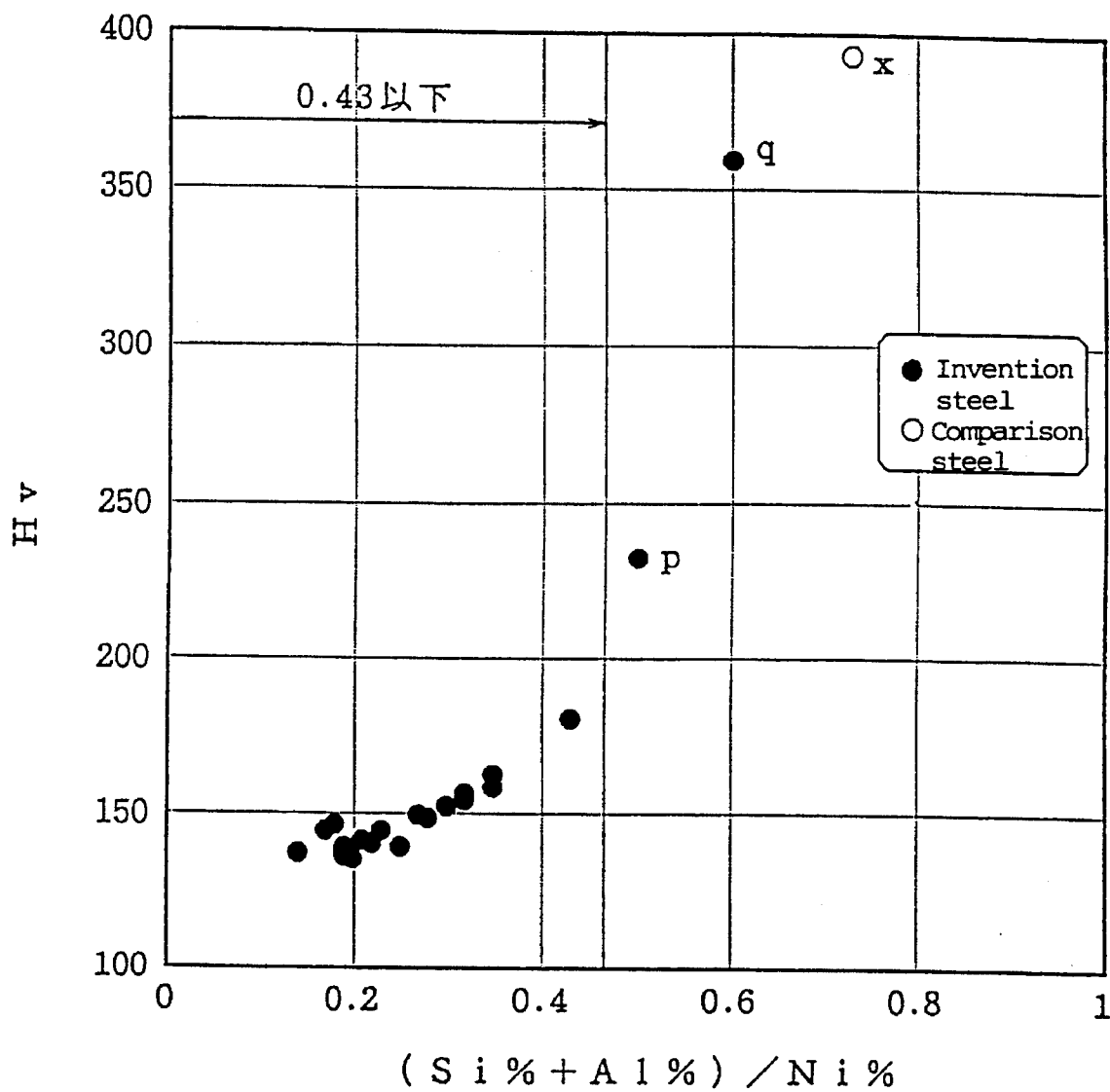
FIG. 3 is a graph showing how the Vickers hardness of steels varies with the ratio (Si%+Al%)/Ni%.

A steel containing Si and Al such as that according to the invention generally tends to undergo an increase in hardness and a decline in workability. When Ni is included so as to satisfy the relationship $$(Si\%+Al\%)/Ni\% \leq 0.47,$$

however, the hardness of the steel is lowered and the workability becomes good (FIG. 3 in the Examples described later).

In addition, a stainless steel containing a large amount of Al exhibits a marked decrease in hot workability and is subject to the occurrence of large cracks in the hot rolled sheet during hot rolling. A steel with an Al content of 2% or more incurs particularly serve cracking and is difficult to produce as a hot-rolled sheet by ordinary methods. A series of experiments conducted for overcoming this problem led to the discovery that even a steel with an Al content as required for maintaining fused-salt corrosion resistance can be hot rolled to obtain a good hot-rolled sheet by regulating the amount of $\delta$ ferrite and temperature of the hot rolled sheet during hot rolling.

More specifically, the following equation was obtained for predicting the amount of $\delta$ ferrite that appears in the invention steel ingot or slab based on the contents of the individual components.

$$\delta(\%)=1.57\cdot Cr+0.7\cdot Si+3.89\cdot Al-1.57\cdot Ni-0.16\cdot Mn-38.5\cdot C-7.65.$$

This equation can be applied for values of $\delta(\%)$ in the range of 0–6. The prediction accuracy falls off above 6. As indicated by the Examples described below (FIGS. 5 and 7), it was found that the steel exhibits excellent hot workability when the contents of the individual components are adjusted to bring the value of $\delta(\%)$ indicated by this equation into the range of 0.5–4.0.

It was also found, however, that even a steel whose $\delta(\%)$ falls in the range of 0.5–4.0 undergoes a rapid change in ductility between 900° and 1000° C. and that, therefore, the temperature of the steel when it exits from the final pass during hot rolling should be not less than 1000° C. In other words, if the hot rolling is completed at a temperature of not less than 1000° C., a good quality hot-rolled sheet can be manufactured without incurring edge cracking or the like.

EXAMPLES

[Example 1]

The chemical compositions, specified in weight percent, of test steels a–q and test steels r–z subjected to testing are shown in Tables 1 and 2, respectively. The test steels a–q are invention steels and the test steels r–z are comparison steels.

TABLE 1

| Test steel | C | Mn | Ni | Cr | Si | Al | Other | Si %/Al % | (Weight %) (Si % + Al %)/Ni % |
|---|---|---|---|---|---|---|---|---|---|
| Invention steels | | | | | | | | | |
| a | 0.055 | 0.50 | 9.25 | 17.00 | 0.41 | 1.15 | | 0.36 | 0.17 |
| b | 0.055 | 0.50 | 9.17 | 17.06 | 0.55 | 1.12 | | 0.68 | 0.18 |
| c | 0.060 | 0.50 | 10.26 | 17.15 | 0.50 | 2.02 | | 0.25 | 0.25 |
| d | 0.053 | 0.50 | 11.31 | 17.61 | 0.47 | 3.11 | | 0.15 | 0.32 |
| e | 0.055 | 0.53 | 13.97 | 16.74 | 0.51 | 3.90 | | 0.13 | 0.32 |
| f | 0.053 | 0.50 | 9.91 | 17.61 | 1.07 | 1.10 | | 0.97 | 0.22 |
| g | 0.052 | 0.52 | 11.92 | 17.10 | 1.08 | 2.09 | | 0.52 | 0.27 |
| h | 0.053 | 0.50 | 14.91 | 16.90 | 3.10 | 3.25 | | 0.95 | 0.43 |
| i | 0.052 | 0.51 | 11.96 | 17.15 | 2.01 | 2.12 | | 0.95 | 0.35 |
| j | 0.054 | 0.52 | 9.80 | 17.18 | 0.72 | 1.20 | Cu: 2.39 | 0.60 | 0.20 |
| k | 0.054 | 0.52 | 9.66 | 17.01 | 0.72 | 1.11 | Mo: 2.12 | 0.65 | 0.19 |
| l | 0.055 | 0.51 | 9.72 | 17.25 | 0.70 | 1.15 | Ti: 0.43 | 0.61 | 0.19 |
| m | 0.057 | 0.52 | 9.78 | 17.03 | 0.69 | 1.18 | Zr: 0.51 | 0.58 | 0.19 |
| n | 0.054 | 0.52 | 9.76 | 16.88 | 0.68 | 1.19 | Y: 0.12 | 0.57 | 0.19 |
| o | 0.056 | 0.52 | 9.79 | 17.26 | 0.67 | 1.22 | REM: 0.20 | 0.55 | 0.19 |
| p | 0.051 | 0.50 | 9.13 | 17.49 | 1.35 | 3.24 | | 0.34 | 0.50 |
| q | 0.053 | 0.51 | 9.25 | 17.09 | 1.55 | 4.00 | | 0.39 | 0.60 |

TABLE 2

| Test steel | C | Mn | Ni | Cr | Si | Al | Other | Si %/Al % | (Si % + Al %)/Ni % | (Weight %) Remarks |
|---|---|---|---|---|---|---|---|---|---|---|
| Comparison Steels | | | | | | | | | | |
| r | 0.052 | 0.51 | 9.17 | 17.33 | 0.16 | 1.09 | | 0.15 | 0.14 | |
| s | 0.052 | 0.52 | 10.33 | 17.27 | 0.14 | 2.00 | | 0.07 | 0.21 | |
| t | 0.053 | 0.50 | 11.12 | 17.36 | 1.54 | 1.01 | | 1.52 | 0.23 | |
| u | 0.054 | 0.50 | 11.89 | 17.21 | 2.11 | 1.23 | | 1.72 | 0.28 | |
| v | 0.054 | 0.51 | 11.90 | 17.33 | 2.43 | 1.10 | | 2.21 | 0.30 | |
| w | 0.054 | 0.51 | 11.92 | 17.17 | 3.05 | 1.14 | | 2.68 | 0.35 | |
| x | 0.051 | 0.50 | 9.06 | 17.15 | 1.69 | 5.14 | | 0.33 | 0.75 | |
| y | 0.016 | 1.05 | 12.90 | 17.41 | 0.60 | — | Mo: 2.14 | — | 0.047 | SUS316L |
| z | 0.073 | 1.58 | 19.50 | 24.85 | 0.79 | — | | — | 0.041 | SUS310S |

Thirty kilograms of each test steel a–q (invention steels) and test steel r–z (comparison steels) was melted and ingotted using a vacuum melting furnace and then hot rolled and annealed to obtain a hot-rolled sheet. Corrosion test specimens were taken from the hot rolled sheet after further annealing, cold rolling and annealing. The test specimens y and z in Table 2 are respectively commercially available SUS316L and SUS310S stainless steels. Both were subjected to the corrosion test.

The corrosion test was conducted by immersing the specimens of the test steels a–z in 62 mol % $Li_2CO_3$–38 mol % $K_2CO_3$ fused carbonate and holding them for 70 hr in an atmosphere of 70 vol % air–30 vol % $CO_2$ gas at a temperature of 650° C. The corroded material formed on the surface of each specimen was removed and the difference in weight of the specimen before and after the test was determined. The difference was divided by the specimen area to obtain the corrosion amount ($mg/cm^2$) used for evaluating fused-carbonate corrosion resistance. The results are shown in FIG. 1, from which the following can be discerned.

Among the test steels a–i (invention steels) not containing any of Cu, Mo, Ti, Zr, Y and RME, those containing about 2% of AL (c, g, and i) had smaller corrosion amounts than those containing about 1% of Al (a, b and f). Moreover, those containing about 3% of Al (d, h and p) had still smaller corrosion amounts than the test steels c, g and i, and those containing about 4% of Al (e and g) and those containing one of Cu, Mo, Ti, Zr, Y and REM (j, k, l, m, n and o) had even smaller corrosion amounts than the test steels d, h and p.

In addition, the test steels a–q (invention steels) containing not less than 0.2% of Si all had smaller corrosion amounts than the test steels r and s (comparison steels) containing less than 0.2% of Si. However, notwithstanding that they contained not less than 0.2% Si and also contained some amount of Al, the test steels t, u, v, and w (comparison steels) were found to have larger corrosion amounts than the test steels a–q (invention steels).

An analysis was made of how the corrosion amount varied as a function of the ratio Si%/Al%. The results are shown in FIG. 2. From FIG. 2 it can be seen that the corrosion resistance against fused carbonate is improved only when the ratio of the Si and Al contents satisfies Si%/Al% ≦ 1.0, and that the corrosion resistance against fused carbonate is even further improved when the ratio satisfies Si%/Al% ≦ 0.4.

Next, specimens cut from sheets obtained in the same manner as in the corrosion test were subjected to Vickers hardness test. The results are shown in FIG. 3, in which the horizontal axis is scaled for the (Si%+Al%)/Ni% value of the tested steels and the vertical axis for Vickers hardness (Hv).

From the results shown in FIG. 3 it can be seen that the Vickers hardness changes rapidly from around the point where (Si%+Al%)/Ni% exceeds 0.47. It will be noted that in the range of (Si%+Al%)/Ni% ≦ 0.47, the Vickers hardness (Hv) is under around 180, a hardness providing good workability.

[Example 2]

Cold-rolled annealed sheets of steels having the chemical compositions (wt %) shown in Table 3 were produced in the same manner as in Example 1 and specimens thereof were subjected to the same test as in Example 1. FIG. 4 was obtained by analyzing the results based on the Si%/Al% ratio in the same manner as in the aforementioned case of FIG. 2.

TABLE 3

| Test steel | C | Mn | Ni | Cr | Si | Al | Other | Si %/Al % | δ (%) |
|---|---|---|---|---|---|---|---|---|---|
| Invention | | | | | | | | | |
| 1a | 0.051 | 0.51 | 12.76 | 17.06 | 0.29 | 1.03 | — | 0.28 | 1.3 |
| 1b | 0.055 | 0.50 | 11.71 | 17.00 | 0.31 | 1.05 | — | 0.30 | 2.8 |
| 1c | 0.055 | 0.49 | 11.98 | 17.06 | 0.70 | 1.09 | — | 0.64 | 2.9 |
| 1d | 0.060 | 0.50 | 14.76 | 17.03 | 0.29 | 2.02 | — | 0.14 | 1.6 |
| 1e | 0.050 | 0.52 | 13.54 | 17.02 | 0.48 | 1.98 | — | 0.24 | 3.9 |

TABLE 3-continued

| Test steel | C | Mn | Ni | Cr | Si | Al | Other | Si %/Al % | δ (%) |
|---|---|---|---|---|---|---|---|---|---|
| 1f | 0.055 | 0.50 | 14.52 | 17.01 | 0.78 | 2.02 | — | 0.39 | 2.5 |
| 1g | 0.052 | 0.51 | 14.45 | 16.95 | 1.14 | 2.01 | — | 0.57 | 2.9 |
| 1h | 0.053 | 0.53 | 14.90 | 16.74 | 0.25 | 2.46 | — | 0.10 | 2.9 |
| 1i | 0.053 | 0.51 | 14.57 | 16.92 | 0.26 | 2.00 | REM: 0.006 | 0.13 | 1.9 |
| 1j | 0.052 | 0.50 | 14.71 | 17.05 | 0.26 | 2.03 | REM: 0.020 | 0.13 | 2.0 |
| 1k | 0.054 | 0.50 | 14.66 | 16.98 | 0.28 | 1.96 | REM: 0.045 | 0.14 | 1.7 |
| 1l | 0.051 | 0.50 | 13.43 | 17.03 | 0.32 | 1.02 | — | 0.31 | 0.2 |
| 1m | 0.051 | 0.50 | 12.28 | 17.06 | 0.50 | 2.01 | — | 0.25 | 6.0 |
| 1n | 0.052 | 0.51 | 14.60 | 17.04 | 0.25 | 2.03 | REM: 0.103 | 0.12 | 2.2 |
| Comparison | | | | | | | | | |
| 1o | 0.050 | 0.50 | 15.96 | 17.00 | 0.49 | 2.00 | — | 0.25 | 0.1 |
| 1p | 0.052 | 0.51 | 11.82 | 16.97 | 0.13 | 1.09 | — | 0.12 | 2.7 |
| 1q | 0.053 | 0.50 | 10.48 | 17.16 | 1.54 | 1.01 | — | 1.52 | 5.8 |
| 1r | 0.054 | 0.50 | 11.89 | 17.08 | 2.11 | 1.23 | — | 1.72 | 4.7 |
| 1s | 0.052 | 0.50 | 12.06 | 17.03 | 0.66 | 0.53 | — | 1.25 | 0.6 |

It can be seen from the results in FIG. 4 that, as in the first Example, the fused carbonate corrosion resistance was good when the Si%/Al% ratio of the steel was not greater than 1.0. The corrosion amounts of the test steels 1q, 1r and 1s shown in FIG. 4 are particularly large. This is because the Si%/Al% ratio was greater than 1.0. The test steel 1p also had a large corrosion amount even though the Si%/Al% ratio was as low as 0.12, because the Si content was less than 0.2%.

[Example 3]

Thirty kilograms of each test steel in Table 3 was melted and ingotted using a vacuum melting furnace and a 35 mm-thick slab was then cut from the ingot. Each slab was soaked for one hour at 1230° C. and then hot rolled at a reduction rate of 30–35% per pass to obtain a 5 mm-thick hot rolled sheet. The temperature of the steel when it exited from the final finishing roll (final pass temperature) was controlled to between 700° and 1050° C. The degree of hot-rolled sheet edge cracking at different final pass temperatures was investigated. The results are shown in Table 4.

TABLE 4

| Test steel | Final pass temp. (°C.) | Edge cracking? | Remarks |
|---|---|---|---|
| 1d | 700 | Yes | Comparison method |
| | 750 | Yes | |
| | 800 | Yes | |
| | 850 | Yes | |
| | 900 | Yes | |
| | 950 | Yes | |
| | 1000 | No | Invention method |
| | 1050 | No | |

As can be seen from the results in Table 4, a hot-rolled steel sheet can be produced without occurrence of edge cracks if the final pass temperature is not lower than 1000° C. The δ(%) value of the test steel 1d was 1.6. The specimens were subjected to a hot tensile test at 1000° C. and the rate of sectional reduction at rupture was determined. An investigation of the relationship between the sectional reduction rate and edge cracking during hot rolling showed that when the sectional reduction rate is 55% or greater, almost no edge cracking occurs during rolling at a final pass temperature of 1000° C. For preventing edge cracking during hot rolling it is therefore preferable for the sectional reduction rate at 1000° C. to be 55% or higher.

[Example 4]

Thirty kilograms of each test steel in Table 3 was melted and ingotted using a vacuum melting furnace, whereafter a round bar specimen was cut from the ingot for use in a hot tensile test. The specimens were subjected to a hot tensile test at 1000° C. and the sectional reduction rate at tensile rupture was measured. The δ(%) value of each specimen was determined using the formula set out in the main section of this specification. The results of these tests are shown in FIG. 5, in which the horizontal axis is scaled for δ(%) and the vertical axis for measured sectional reduction rate.

Figure 5:
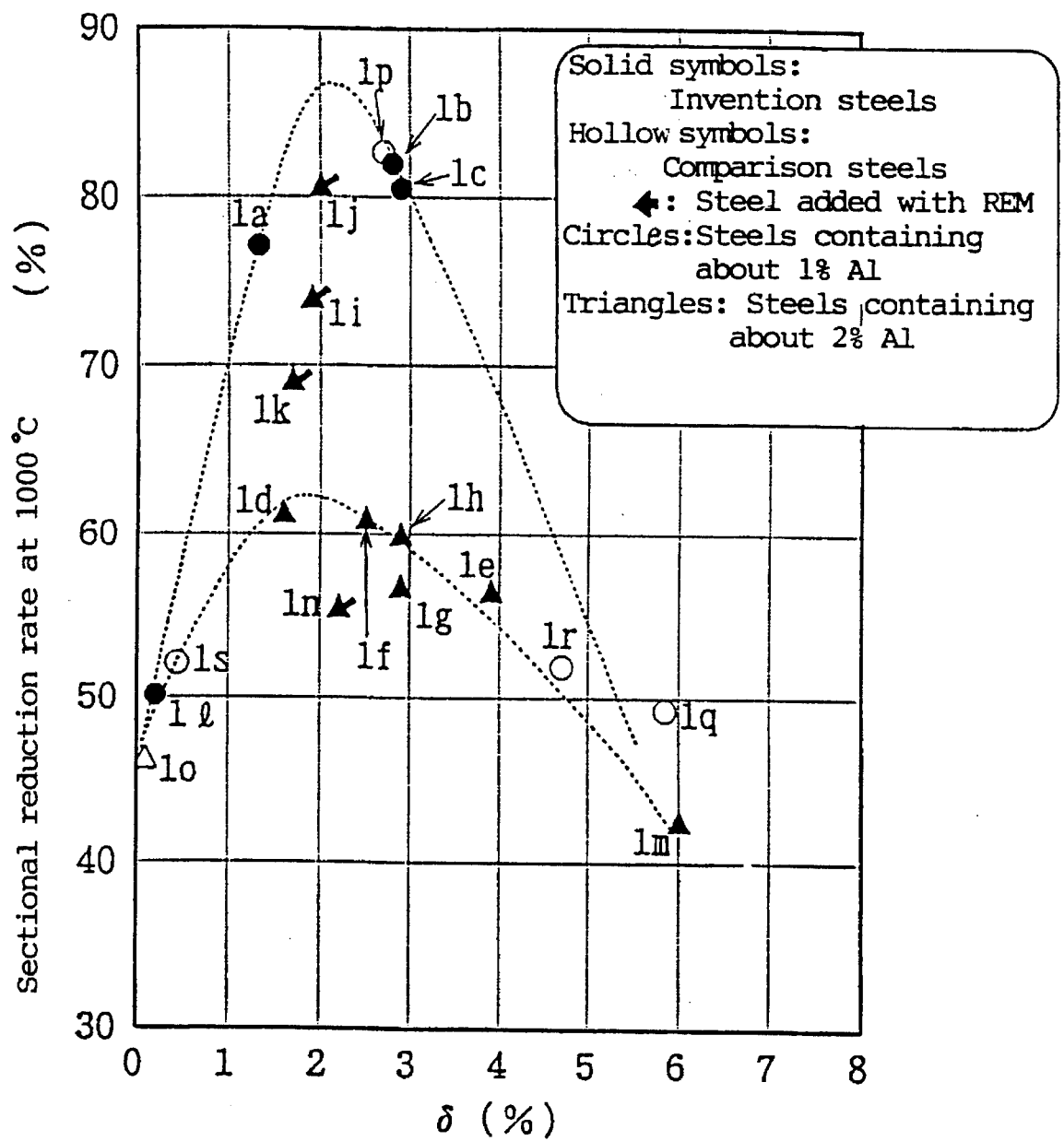
FIG. 5 is a graph showing how the rate of sectional reduction in a tensile test (1000° C.) varies with the steel δ(%) value.
Figure 6:
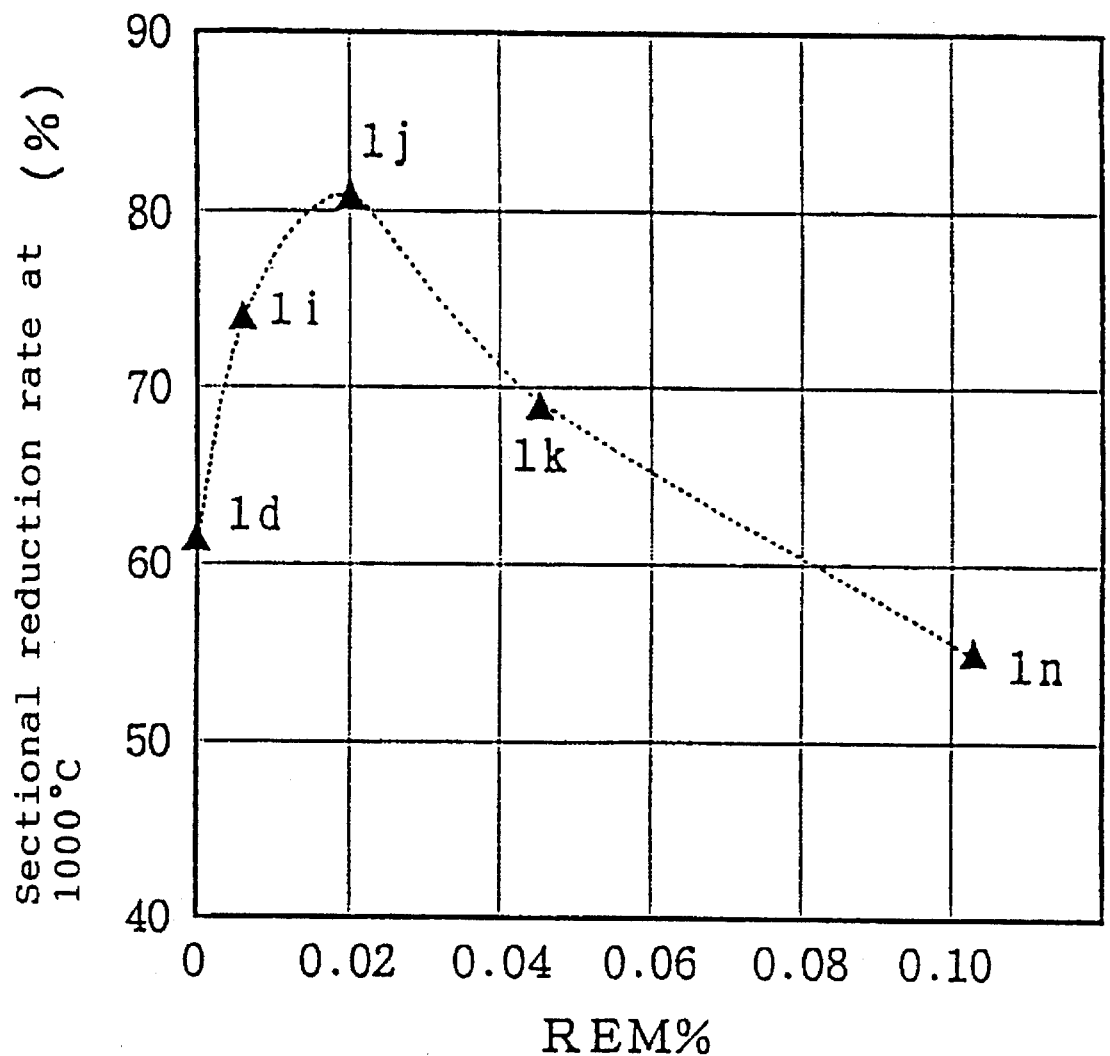
FIG. 6 is a graph showing how the rate of sectional reduction in a tensile test (1000° C.) varies with the steel REM content.

As is clear from FIG. 5, the sectional reduction rate was low and the hot workability poor when the value of δ(%) was high. On the other hand, the sectional reduction rate was also low when the δ(%) value was too low. FIG. 5 shows that the sectional reduction rate became 55% or greater when δ(%) was in the range of 0.5–4.0%. It will be understood that the hot workability is good in this case. Although the hot workability of the test steel 1p was good, it had poor fused-carbonate corrosion resistance, as shown in FIG. 4.

Next, the relationship between the 2% Al content steels of Table 3 added with REM and the sectional reduction rate in a hot tensile test was examined. The results are shown in FIG. 6. As will be noted from this figure, the sectional reduction rate (hot ductility) improved with REM addition but was degraded by addition exceeding a certain amount. This is thought to be because the presence of excessive REM in the steel increases the amount of oxides and other inclusions, which has an adverse effect on the hot workability. At any rate, it was found that the hot workability was best when the REM content was not more than 0.05%, more specifically when it was in the vicinity of around 0.02%.

[Example 5]

Test steels having the chemical compositions (wt %) shown in Table 5 were produced in the same manner as in Example 1 and specimens thereof were subjected to the same fused-carbonate corrosion resistance test as in Example 1. In addition, specimens were fabricated in the manner of Example 4 and a 1000° C. hot tensile test was conducted in the same manner as in Example 4 to determine their sectional reduction rates. The results of these tests are shown together in FIG. 7.

TABLE 5

| Test steel | C | Mn | Ni | Cr | Si | Al | Other | Si%/Al% | δ (%) |
|---|---|---|---|---|---|---|---|---|---|
| Invention | | | | | | | | | |
| 2a | 0.050 | 0.50 | 12.69 | 17.03 | 0.31 | 0.99 | — | 0.31 | 1.3 |
| 2b | 0.052 | 0.51 | 11.87 | 17.02 | 0.27 | 1.04 | — | 0.26 | 2.6 |
| 2c | 0.051 | 0.51 | 12.12 | 16.93 | 0.77 | 0.95 | — | 0.81 | 2.1 |
| 2d | 0.050 | 0.50 | 14.70 | 16.95 | 0.28 | 2.00 | — | 0.14 | 1.9 |
| 2e | 0.051 | 0.50 | 14.51 | 16.92 | 1.14 | 1.94 | — | 0.59 | 2.5 |
| 2f | 0.052 | 0.51 | 14.68 | 17.05 | 0.26 | 2.01 | REM: 0.022 | 0.13 | 2.0 |
| Comparison | | | | | | | | | |
| 2g | 0.051 | 0.51 | 16.00 | 17.05 | 0.30 | 2.08 | — | 0.14 | 0.3 |
| 2h | 0.051 | 0.49 | 11.95 | 17.10 | 0.12 | 1.00 | — | 0.12 | 2.4 |
| 2i | 0.052 | 0.50 | 12.72 | 17.06 | 1.49 | 1.02 | — | 1.46 | 2.2 |
| 2j | 0.070 | 1.49 | 19.84 | 24.93 | 0.78 | — | — | — | — |

Figure 7:
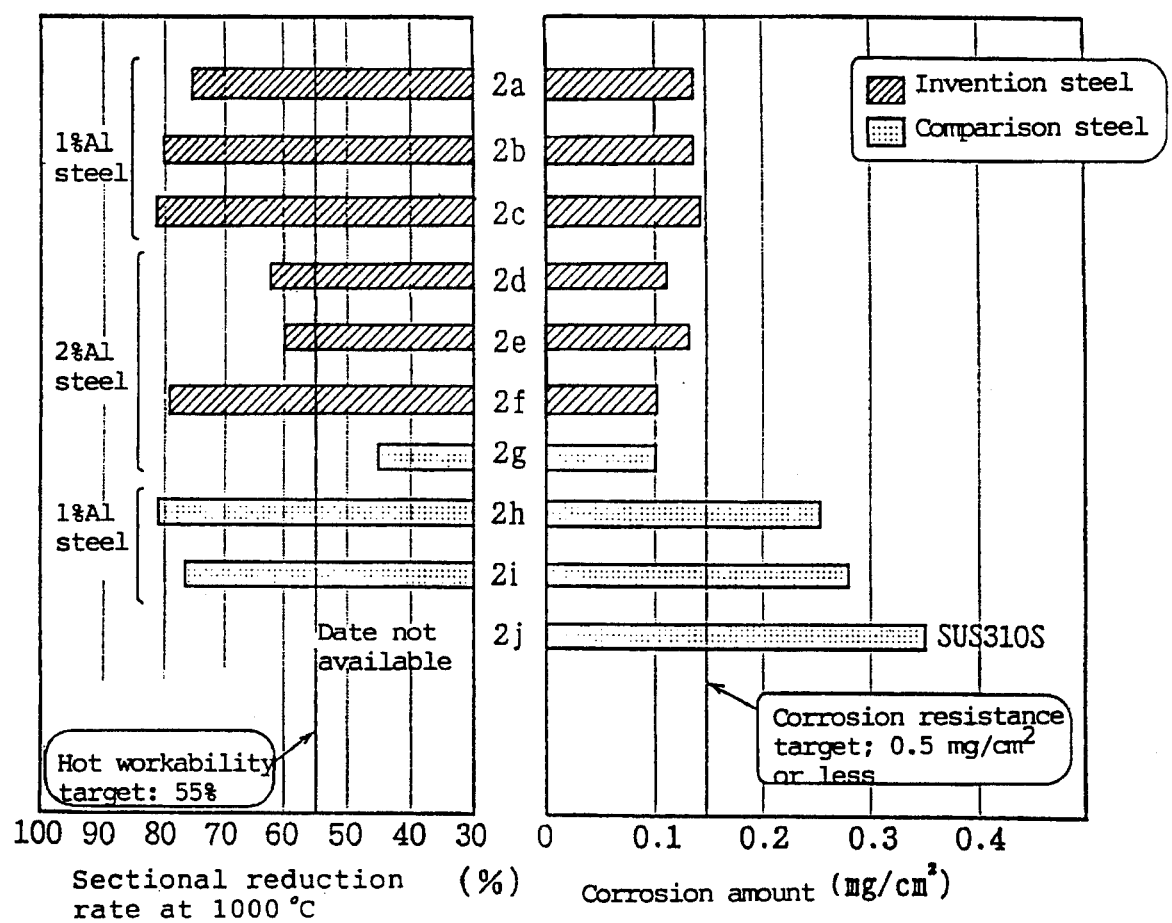
FIG. 7 is a graph showing the rate of sectional reduction in a tensile test (1000° C.) and the amount of corrosion in a fused carbonate corrosion test of invention steels and comparison steels.

From the results in FIG. 7 it can be seen that all of the steels 2a–2f falling within the composition range stipulated by this invention had amounts of corrosion in fused carbonate that were less than one-half that of SUS310S (2j) and exhibited good fused-carbonate corrosion resistance. As shown in Table 5, moreover, all of the invention steels (2a–2f) had δ(%) values in the range of 0.5–4.0 and sectional reduction rates at 1000° C. of 55% or greater, and thus exhibited good hot workability.

In contrast, the steel 2h had poor corrosion resistance because the value of Si% was less than 0.2 while the steel 2i had poor corrosion resistance because Si%/Al% ratio was greater than 1.0. Steel 2g had poor hot workability since its δ(%) value was outside the 0.5–4.0 range.

As explained in the foregoing, in accordance with this invention there can be obtained a stainless steel exhibiting improved corrosion resistance against fused carbonate not withstanding its relatively low Cr and Ni content. Even though the steel contains a relatively large amount of Al, it can be hot rolled with high yield. As a result, it becomes possible to provide an alternative fuel cell separator that is inexpensive and excellent in durability.

We claim:

1. A method of producing a stainless steel excellent in fused-salt corrosion resistance characterized in that an austenitic stainless steel having a composition specified in weight per cent including not more than 0.1% of C, not more than 2.0% of Mn, not less than 7.5% and less than 15.0% of Ni, more than 15.0 not more than 20.0% of Cr, more than 0.2% and not more than 4.0% of Si, and 1.0–4.0% of Al, satisfying the relationship Si%/Al%≦1.0, and having its individual component contents adjusted such that the value of δ(%) represented by the equation $$\delta(\%) = 1.57 \cdot Cr + 0.7 \cdot Si + 3.89 \cdot Al - 1.57 \cdot Ni - 0.16 \cdot Mn - 38.5 \cdot C - 7.65$$

is in the range of 0.5–4.0, the balance being Fe and unavoidable impurities, is hot rolled into a steel sheet using a final hot rolling pass temperature of not less than 1000° C.

2. A method according to claim 1, wherein the stainless steel contains one or more of not more than 3.0% of Cu, not more than 3.0% of Mo, not more than 1.0% of Ti, not more than 1.0% of Zr, not more than 0.5% Y, and not more than 0.05% of REM (rare earth elements).

3. A stainless steel excellent in fused-salt corrosion resistance having a composition specified in weight per cent including:

not more than 0.1% of C, not more than 2.0% of Mn, not less than 7.5% and less than 15.0% of Ni, more than 15.0 not more than 20.0% or Cr, more than 0.2% and not more than 4.0% of Si, and 1.0–4.0% of Al, and satisfying the following two relationships Si%/Al%≦1.0 and (Si%+Al%)/Ni% ≦0.47 wherein the individual component contents are adjusted such that the value of δ(%) represented by the equation $$\delta(\%) = 1.57 \times Cr + 0.7 \times Si + 3.89 \times Al - 1.57 \times Ni - 0.16 \times Mn - 38.5 \times C - 7.65$$

is in the range of 0.5–4.0, the balance being Fe and unavoidable impurities.

4. A stainless steel according to claim 3 wherein the steel includes one component selected from the group consisting of not more than 3.0% of Cu, not more than 3.0% of Mo, not more than 1.0% of Ti, not more than 1.0% of Zr, not more than 0.5% Y, and not more than 0.5% of REM (rare earth elements).

* * * * *